US012171699B2

(12) United States Patent
Byun et al.

(10) Patent No.: US 12,171,699 B2
(45) Date of Patent: Dec. 24, 2024

(54) AUTO SLIDING RAMP FOR VEHICLE

(71) Applicants: Hyundai Motor Company, Seoul (KR); Kia Corporation, Seoul (KR)

(72) Inventors: Ji Soo Byun, Suwon-si (KR); Hyun Woo Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 419 days.

(21) Appl. No.: 17/748,658

(22) Filed: May 19, 2022

(65) Prior Publication Data
US 2023/0072090 A1 Mar. 9, 2023

(30) Foreign Application Priority Data

Aug. 30, 2021 (KR) .................. 10-2021-0114451

(51) Int. Cl.
*F16D 11/14* (2006.01)
*A61G 3/06* (2006.01)
*B60P 1/43* (2006.01)
*F16D 28/00* (2006.01)

(52) U.S. Cl.
CPC ............... *A61G 3/061* (2013.01); *B60P 1/43* (2013.01); *F16D 11/14* (2013.01); *F16D 28/00* (2013.01); *A61G 3/067* (2016.11)

(58) Field of Classification Search
CPC ............ F16D 11/14; F16D 2011/004; F16D 2500/50221; A61G 3/061; H02K 7/10
See application file for complete search history.

(56) References Cited

U.S. PATENT DOCUMENTS

| 5,048,653 | A | * | 9/1991 | Fellows | E05F 15/684 |
| | | | | | 192/69.62 |
| 5,871,329 | A | * | 2/1999 | Tidrick | A61G 3/061 |
| | | | | | 14/71.3 |
| 6,230,864 | B1 | * | 5/2001 | Cline | F16D 11/10 |
| | | | | | 192/69 |
| 2003/0007853 | A1 | * | 1/2003 | Cohn | F16H 7/24 |
| | | | | | 414/537 |
| 2006/0066114 | A1 | * | 3/2006 | Oberheide | F16D 11/14 |
| | | | | | 292/199 |
| 2019/0106042 | A1 | * | 4/2019 | Hill | B60P 1/431 |

FOREIGN PATENT DOCUMENTS

CN 109210099 A * 1/2019 ............. F16D 11/14

* cited by examiner

*Primary Examiner* — Stacey A Fluhart
(74) *Attorney, Agent, or Firm* — Slater Matsil, LLP

(57) ABSTRACT

An embodiment auto sliding ramp for a vehicle includes a drive motor, a clutch rod including a clutch body slidably inserted inside the drive motor and a clutch gear mounted on the clutch body, a motor clutch connecting the drive motor and the clutch rod, a ramp drive unit configured to drive the ramp according to its rotation, a main drive including a drive gear engaged with the ramp drive unit and a drive shaft connected to the drive gear and configured to manually rotate the drive gear, and a clutch operation part configured to disengage the motor clutch by pushing the clutch rod.

20 Claims, 11 Drawing Sheets

AUTO SLIDING RAMP FOR VEHICLE

CROSS-REFERENCE TO RELATED APPLICATIONS

This application claims the benefit of Korean Patent Application No. 10-2021-0114451, filed on Aug. 30, 2021, which application is hereby incorporated herein by reference.

TECHNICAL FIELD

The present invention relates to an auto sliding ramp for a vehicle.

BACKGROUND

Sliding ramps are being developed to be applied to buses, particularly low-floor buses, in order to increase the convenience of getting on and off the transportation for the weak.

In general, by manipulating the operation switch of the driver's seat, the ramp is automatically protruded or stored.

However, due to the low frequency of use of the ramp and so on, intermittent operation failure occurs due to sticking, and the user has to deploy the ramp by manual operation.

The manual operation method of the ramp has a potential risk of user injury during operation, and there is an inconvenience in that the user directly pulls the step with strong force to operate.

That is, the motor clutch cover installed on the bottom of the middle door of the bus is removed using a tool, the motor clutch bolt is locked using the tool, and the ramp cover is opened and fixed by moving out of the vehicle through the intermediate door. Then, the step is pulled by hand, and the step is taken out.

However, in a situation where the cover is fixed by hand after releasing the motor clutch, there is a risk of user injury due to the hand being caught by the cover fixed by a strong spring or taking out the step and the operation part of the ramp mechanism.

In addition, there is a problem of low convenience because the user has to take out the step and manually operate it.

The above information disclosed in this background section is only for enhancement of understanding of the background of the invention, and therefore it may contain information that does not form the prior art that is already known to a person of ordinary skill in the art.

SUMMARY

The present invention relates to an auto sliding ramp for a vehicle. Particular embodiments relate to an auto sliding ramp for a vehicle capable of automatic and manual operation.

Embodiments of the present invention provide an auto sliding ramp for a vehicle capable of automatic and manual operation that may reduce the operator's operation burden.

An auto sliding ramp for a vehicle according to an exemplary embodiment of the present invention may include a drive motor, a clutch rod including a clutch body slidably inserted inside the drive motor and a clutch gear mounted on the clutch body, a motor clutch connecting the drive motor and the clutch rod, a ramp drive unit that drives the ramp according to its rotation, a main drive including a drive gear engaged with the ramp drive unit, and a drive shaft connected to the drive gear to manually rotate the drive gear, and a clutch operation part to disengage the motor clutch by pushing the clutch rod.

The clutch operation part may include a guide part mounted on the ramp housing corresponding to the position of the clutch rod and of which a guide thread is formed therein, and a motor clutch bolt engaged with the guide thread and disengaging the connection between the drive motor and the clutch rod by pushing the clutch rod according to its rotation.

The auto sliding ramp according to an exemplary embodiment of the present invention may further include a motor gear connecting the clutch gear and the main drive.

The motor gear may include an inner gear in which the clutch gear is movably provided in the length direction of the clutch body, and is formed to be engaged with the clutch gear, and an outer gear configured to be engaged with the main drive.

The main drive may further include a connecting gear engaged with the outer gear.

The main drive may further include a drive shaft nut provided at one end of the drive shaft with the same dimensions as the motor clutch bolt.

The auto sliding ramp according to an exemplary embodiment of the present invention may further include a bolt cover that is detachably coupled to the ramp housing to cover the motor clutch bolt and the drive shaft.

The clutch operation part may include a manual lever of which a lever hole into which the drive shaft is inserted is formed thereto and having a lever rod provided at a position corresponding to the clutch rod.

The clutch operation part may further include a return spring mounted on the drive shaft to elastically support the manual lever.

A guide hole may be formed in the manual lever, and the clutch operation part may further include a guide pin inserted into the guide hole to guide the movement of the manual lever.

The auto sliding ramp according to an exemplary embodiment of the present invention may further include a bolt cover that is detachably coupled to the ramp housing to cover the drive shaft.

The motor clutch may include a clutch elasticity part elastically supporting the clutch rod, and a clutch pad selectively in contact with the rotor of the drive motor according to the position of the clutch elasticity part.

According to the auto sliding ramp for a vehicle according to an exemplary embodiment of the present invention, it is easy to convert the manual operation mode from the automatic operation mode to reduce the operation burden of the worker.

In addition, according to the auto sliding ramp for a vehicle according to an exemplary embodiment of the present invention, the worker does not manually operate the step, so the safety of the worker can be promoted.

In addition, the effects obtainable or predicted by the embodiments of the present invention are to be disclosed directly or implicitly in the detailed description of the embodiments of the present invention. That is, various effects predicted according to an embodiment of the present invention will be disclosed in the detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

Figure 1:
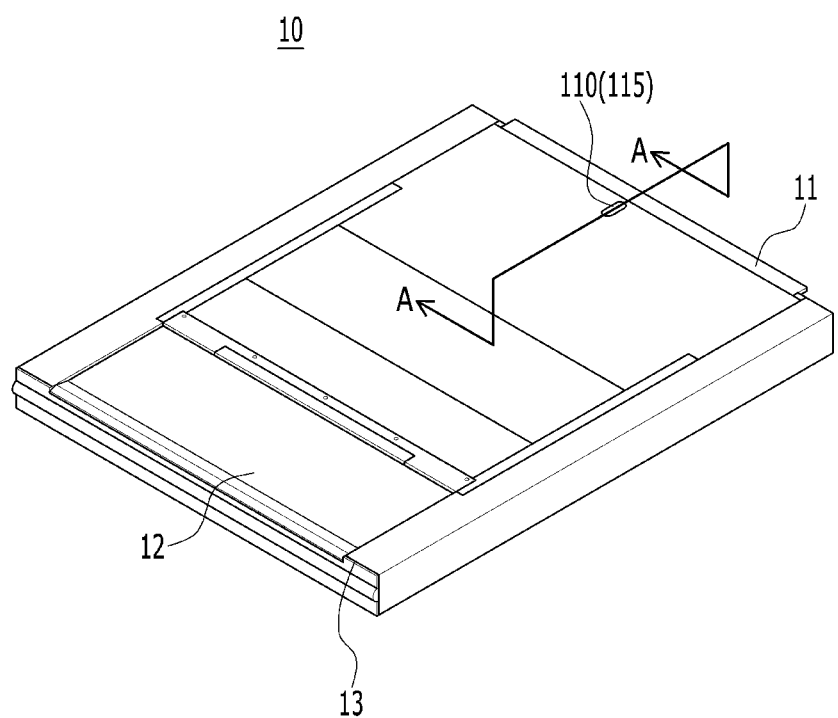
FIG. 1 is a perspective view of an auto sliding ramp for a vehicle according to an exemplary embodiment of the present invention.

The following elements may be used in connection with the figures to explain various features of embodiments of the present invention as illustrated in the accompanying drawings.

| | |
|---|---|
| 10: auto sliding ramp | 11: ramp housing |
| 12: step | 13: step guide |
| 15: clutch rod hole | 17: drive shaft hole |
| 18: support plate | 20: clutch rod |
| 22: clutch body | 24: clutch gear |
| 30: drive motor | 32: motor housing |
| 34: rotor | 40: motor clutch |
| 42: clutch elasticity part | 44: clutch pad |
| 50: ramp drive unit | 52: chain |
| 60, 61: main drive | 62: drive gear |
| 64: drive shaft | 66: connecting gear |
| 68: drive shaft nut | 69: drive shaft wedge |
| 70, 90: clutch operation part | 72: guide part |
| 74: guide thread | 76: motor clutch bolt |
| 80: motor gear | 82: inner gear |
| 84: outer gear | 91: manual lever |
| 92: lever hole | 94: lever rod |
| 96: return spring | 98: guide hole |
| 100: guide pin | 110, 115: bolt cover |
| 111: clutch rod hole cap | 112, 117: drive shaft hole cap |
| 120, 122: bush | T: tool |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the detailed description below, the reason that the names of the components are divided into first, second, etc. is to classify the components in the same relationship, and it is not necessarily limited to the order in the following description.

Throughout the specification, when a part includes a certain component, it means that other components may be further included, rather than excluding other components, unless otherwise stated.

In addition, terms such as . . . part and . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

Figure 2:
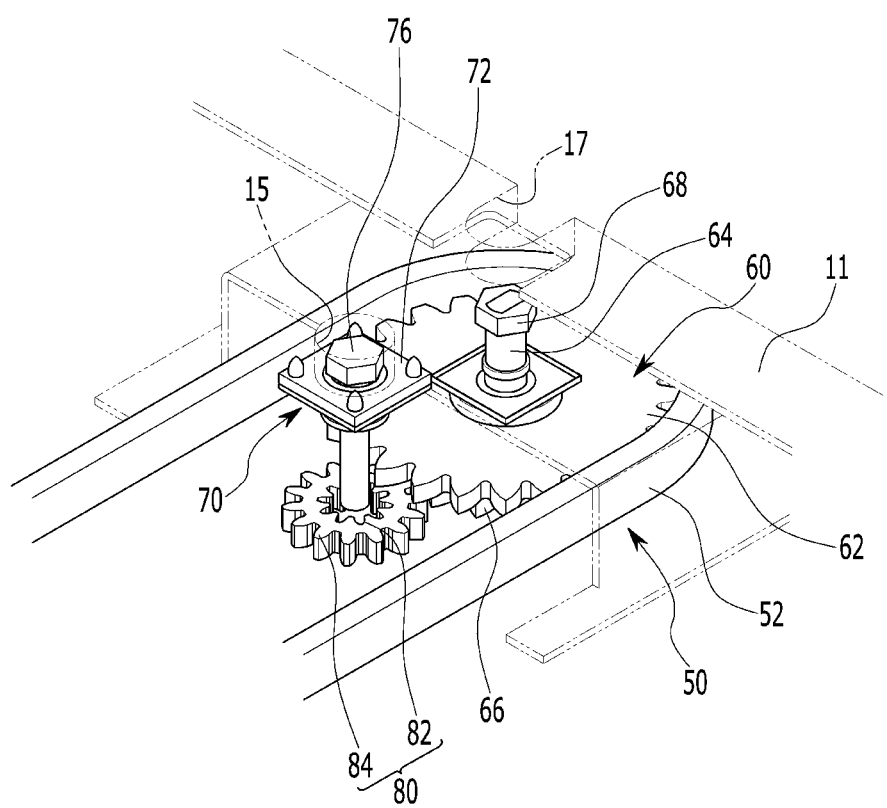
FIG. 2 is a partial perspective view of an auto sliding ramp for a vehicle according to an exemplary embodiment of the present invention.
Figure 3:
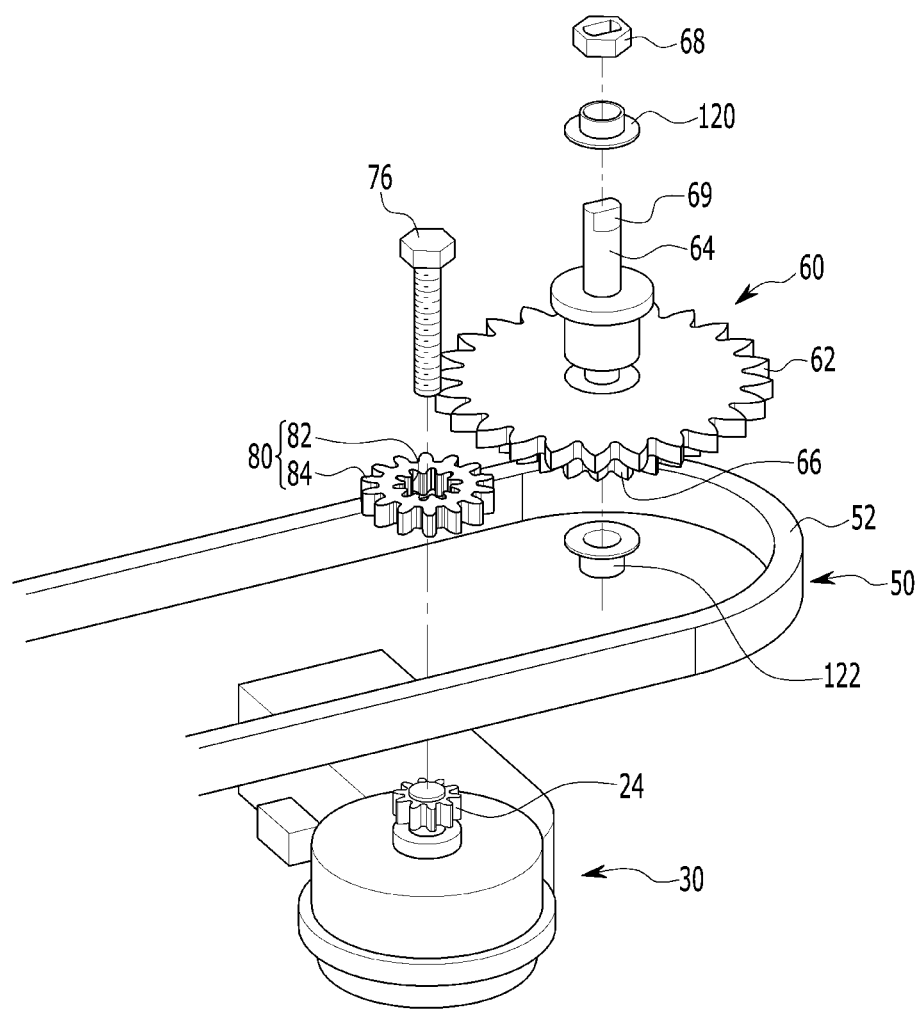
FIG. 3 is a partial exploded perspective view of an auto sliding ramp for a vehicle according to an exemplary embodiment of the present invention.

FIG. 1 is a perspective view of an auto sliding ramp for a vehicle according to an exemplary embodiment of the present invention, FIG. 2 is a partial perspective view of an auto sliding ramp for a vehicle according to an exemplary embodiment of the present invention, and FIG. 3 is a partial exploded perspective view of an auto sliding ramp for a vehicle according to an exemplary embodiment of the present invention.

Figure 4:
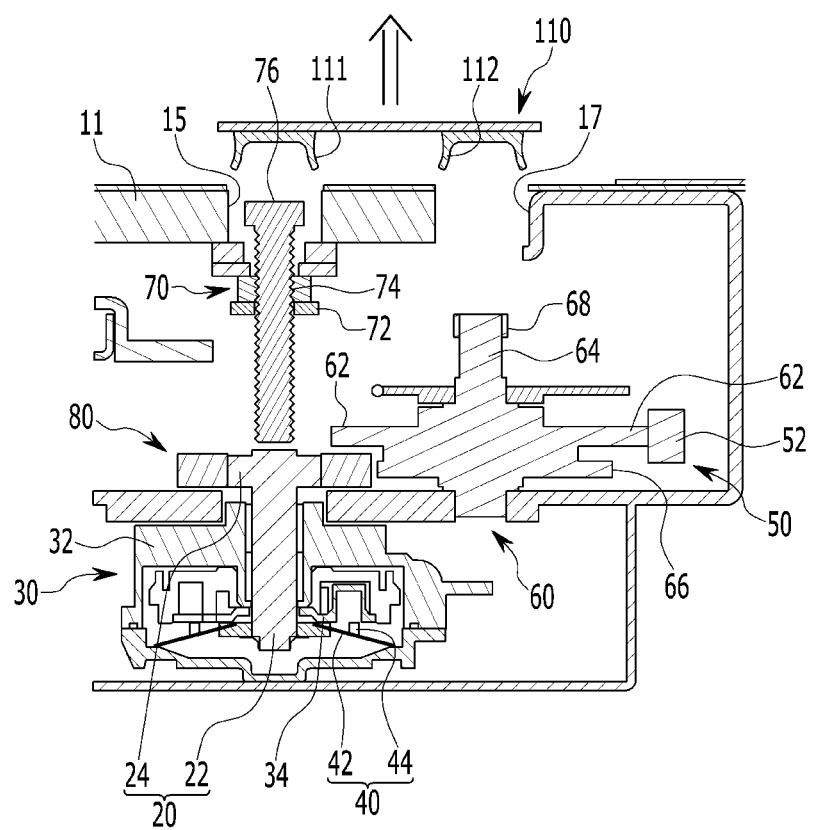
FIG. 4 is a cross-sectional view of an auto sliding ramp for a vehicle according to an exemplary embodiment of the present invention along the A-A line of FIG. 1.
Figure 5:
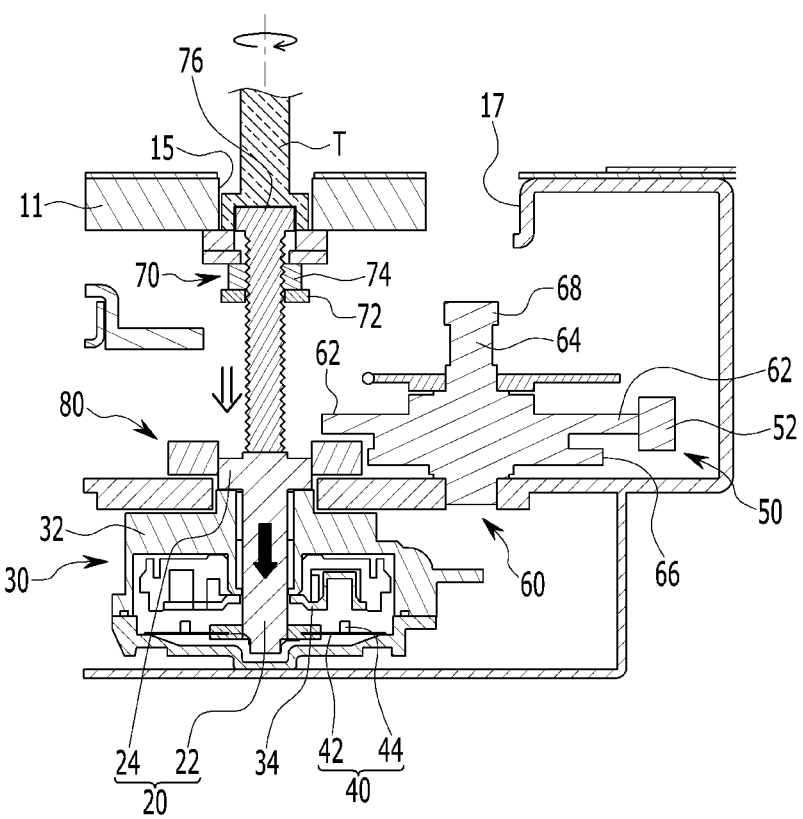
FIG. 5 and FIG. 6 are cross-sectional views along the line A-A of FIG. 1, and show the operation of the manual mode of the auto sliding ramp for a vehicle according to an exemplary embodiment of the present invention.
Figure 6:
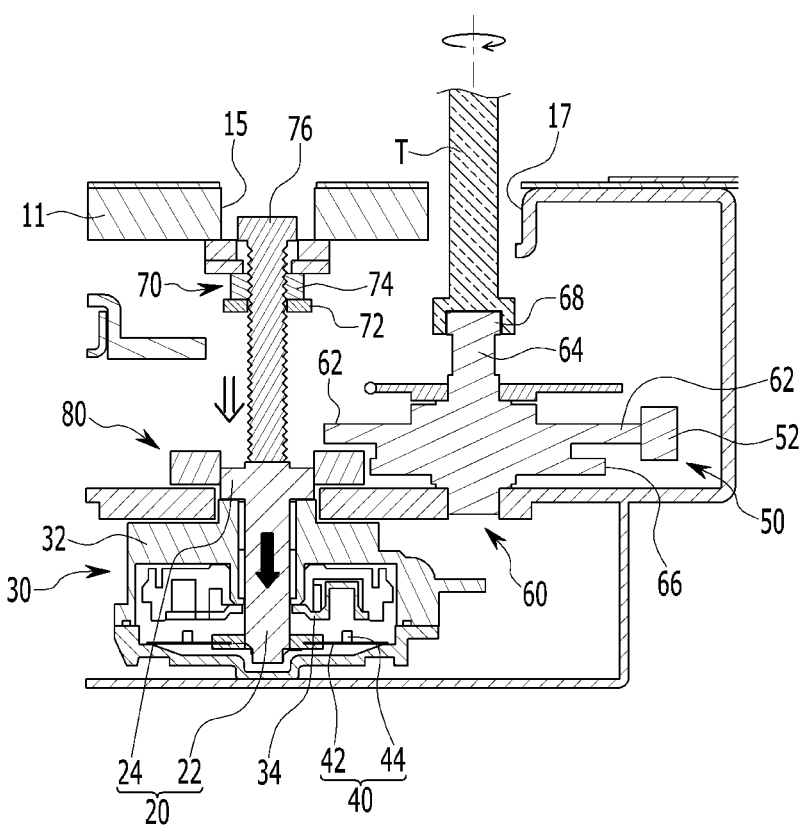

FIG. 4 is a cross-sectional view of an auto sliding ramp for a vehicle according to an exemplary embodiment of the present invention along the A-A line of FIG. 1, and FIG. 5 and FIG. 6 are cross-sectional views along the line A-A of FIG. 1, and show the operation of the manual mode of the auto sliding ramp for a vehicle according to an exemplary embodiment of the present invention.

Hereinafter, referring to FIG. 1 to FIG. 6, an auto sliding ramp for a vehicle according to an exemplary embodiment of the present invention will be described.

An auto sliding ramp 10 for a vehicle according to an exemplary embodiment of the present invention may include a drive motor 30, a clutch rod 20, a motor clutch 40 connecting the drive motor 30 and the clutch rod 20, a ramp drive unit 50 that drives the ramp according to its rotation, a main drive 60 and a clutch operation part 70 to disengage the motor clutch 40 by pushing the clutch rod 20.

The clutch rod 20 may include a clutch body 22 slidably inserted inside the drive motor 30 and a clutch gear 24 mounted on the clutch body 22.

The main drive 60 may include a drive gear 62 engaged with the ramp drive unit 50, and a drive shaft 64 connected to the drive gear 62 to manually rotate the drive gear 62.

The clutch operation part 70 may include a guide part 72 mounted on the ramp housing 11 corresponding to the position of the clutch rod 20 and of which a guide thread 74 is formed thereon, and a motor clutch bolt 76 engaged with the guide thread 74 and disengaging the connection between the drive motor 30 and the clutch rod 20 by pushing the clutch rod 20 according to its rotation.

The auto sliding ramp 10 for a vehicle according to an exemplary embodiment of the present invention may further include a motor gear 80 connecting the clutch gear 24 and the main drive 60.

The motor gear 80 includes an inner gear 82 in which the clutch gear 24 is movably provided in the length direction of the clutch body 22, and is formed to be engaged with the clutch gear 24, and an outer gear 84 configured to be engaged with the main drive 60.

The main drive 60 may further include a connecting gear 66 engaged with the outer gear 84.

The motor clutch 40 may include a clutch elasticity part 42 elastically supporting the clutch rod 20, and a clutch pad 44 selectively in contact with the rotor 34 of the drive motor 30 according to the position of the clutch elasticity part 42.

The main drive 60 may further include a drive shaft nut 68 provided at one end of the drive shaft 64 with the same dimensions as the motor clutch bolt 76.

At one end of the drive shaft 64, a drive shaft wedge 69 is formed so that the drive shaft nut 68 may be engaged thereto.

At both ends of the drive shaft 64, bushes 120 and 122 are mounted to rotatably support the drive shaft 64.

A clutch rod hole 15 is formed to be accessible to the motor clutch bolt 76, and a drive shaft hole 17 is formed to be accessible to the drive shaft nut 68 in the ramp housing 11.

An auto sliding ramp 10 for a vehicle according to an exemplary embodiment of the present invention may further include a bolt cover no that is detachably coupled to the ramp housing 11 to cover the motor clutch bolt 76 and the drive shaft 64.

That is, in the bolt cover 110, a clutch rod hole cap 111 and a drive shaft hole cap 112 that may cover the clutch rod hole 15 and the drive shaft hole 17 are formed, respectively, and the clutch rod hole cap 111 and the drive shaft hole cap 112 are made of a material with elasticity, so it is possible to mount or detach the bolt cover no manually or with a simple tool.

The drive motor 30 may include a motor housing 32 and a rotor 34 rotatably mounted to the motor housing 32. The drive motor 30 is a general electric motor, and its specific configuration and operation are obvious to those skilled in the art, so a detailed description will be omitted.

The ramp drive unit 50 may include, for example, a chain 52, and the chain 52 may deploy or receive a step 12 through gears (not shown).

Since the specific configuration and operation of the chain 52, gears and the step 12 are obvious to those skilled in the art, a detailed description thereof will be omitted.

The ramp housing 11 may be provided with a step guide 13 guiding the movement of the step 12. For example, the step guide 13 may be rails.

Hereinafter, referring to FIG. 1 to FIG. 6, an operation of an auto sliding ramp for a vehicle according to an exemplary embodiment of the present invention will be described.

In normal automatic mode, when the driver operates the switch, the rotor 34 of the drive motor 30 rotates.

At this time, the motor clutch 40 is in the operating state, that is, in the engaged state, the rotation of the rotor 34 is transmitted to the motor clutch 40, the clutch rod 20 is rotated, and the motor gear 80 engaged with the clutch gear 24 of the clutch rod 20 rotates. That is, at this time, the clutch pad 44 is in contact with the rotor 34 due to the clutch elasticity part 42.

Then, the connecting gear 66 engaged with the outer gear 84 of the motor gear 80 rotates and the drive gear 62, which rotates integrally with the connecting gear 66, drives the chain 52. Then, the step 12 may be deployed from the ramp housing 11 or accommodated in the ramp housing 11 by driving the chain 52.

If the deployment or storage of the step 12 by the operation of the drive motor 30 is not possible due to a failure or sticking of the drive motor 30, the user may operate the auto sliding ramp 10 for the vehicle in manual mode.

Referring to FIG. 1 and FIG. 4, a worker manually removes the bolt cover 110 from the ramp housing 11.

And, as shown in FIG. 5, the user inserts a tool T, for example a wrench, into the clutch rod hole 15 and rotates the motor clutch bolt 76. Then, the motor clutch bolt 76 is moved in the downward direction of the drawing to press the clutch gear 24, and the clutch body 22 releases the motor clutch 40. That is, the clutch elasticity part 42 is deformed by the movement of the clutch rod 20, and the clutch pad 44 is disengaged from the rotor 34.

Accordingly, the main drive 60 and the drive motor 30 are separated.

Thereafter, referring to FIG. 6, the user may insert the tool T, for example a wrench, through the drive shaft hole 17 and rotate the drive shaft nut 68, and the drive gear 62 rotates and drives the chain 52 so that the step 12 may be deployed from the ramp housing 11 or housed in the ramp housing 11.

After that, when the worker rotates the motor clutch bolt 76 in reverse using the tool T, the motor clutch 40 is engaged and may be converted to automatic mode.

Here, when the motor clutch bolt 76 and the drive shaft nut 68 are of the same size, that is, in the case of the same type of fastening devices, with one tool T, the clutch operation part 70 may be connected or disconnected and the main drive 60 may be driven.

Figure 7:
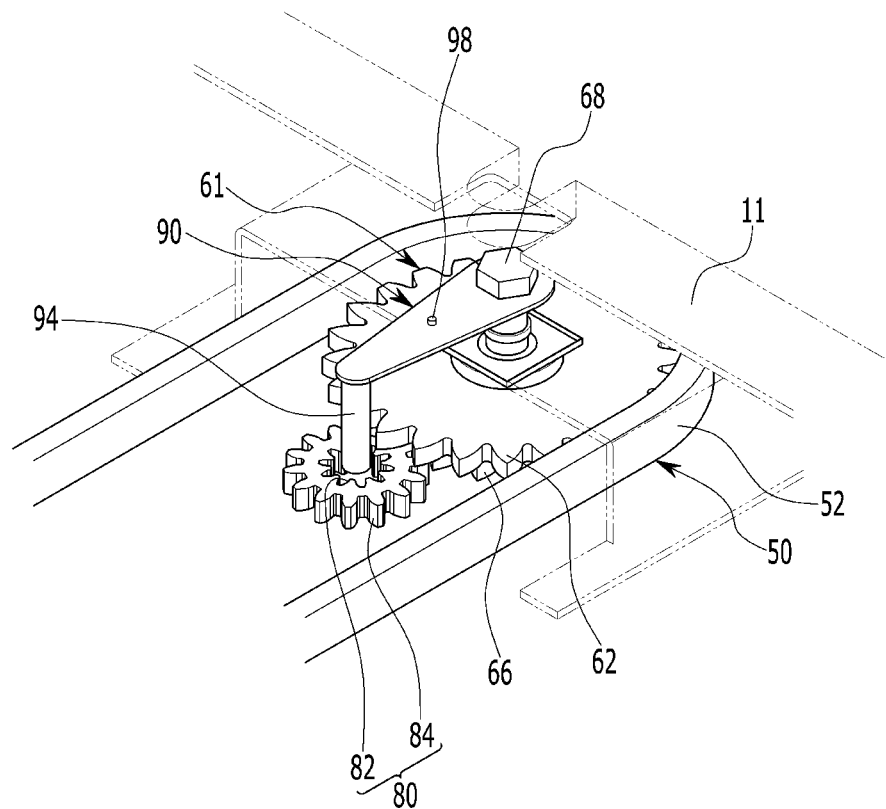
FIG. 7 is a partial perspective view of an auto sliding ramp for a vehicle according to another exemplary embodiment of the present invention.
Figure 8:
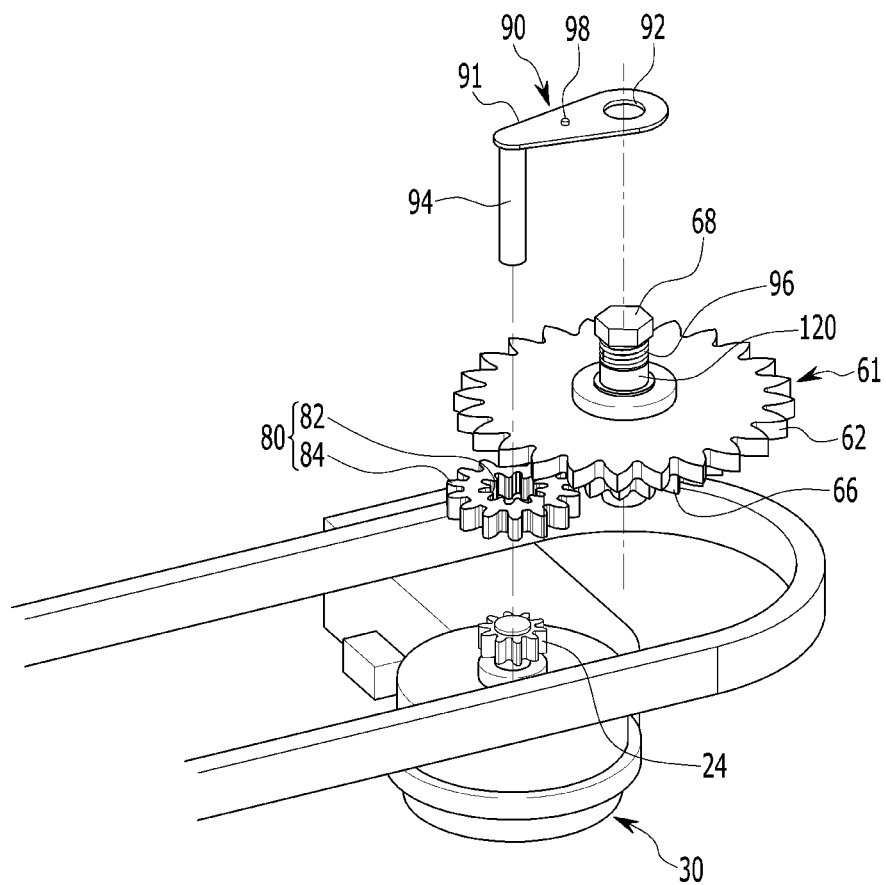
FIG. 8 is a partial exploded perspective view of an auto sliding ramp for a vehicle according to another exemplary embodiment of the present invention.

FIG. 7 is a partial perspective view of an auto sliding ramp for a vehicle according to another exemplary embodiment of the present invention, and FIG. 8 is a partial exploded perspective view of an auto sliding ramp for a vehicle according to another exemplary embodiment of the present invention.

Figure 9:
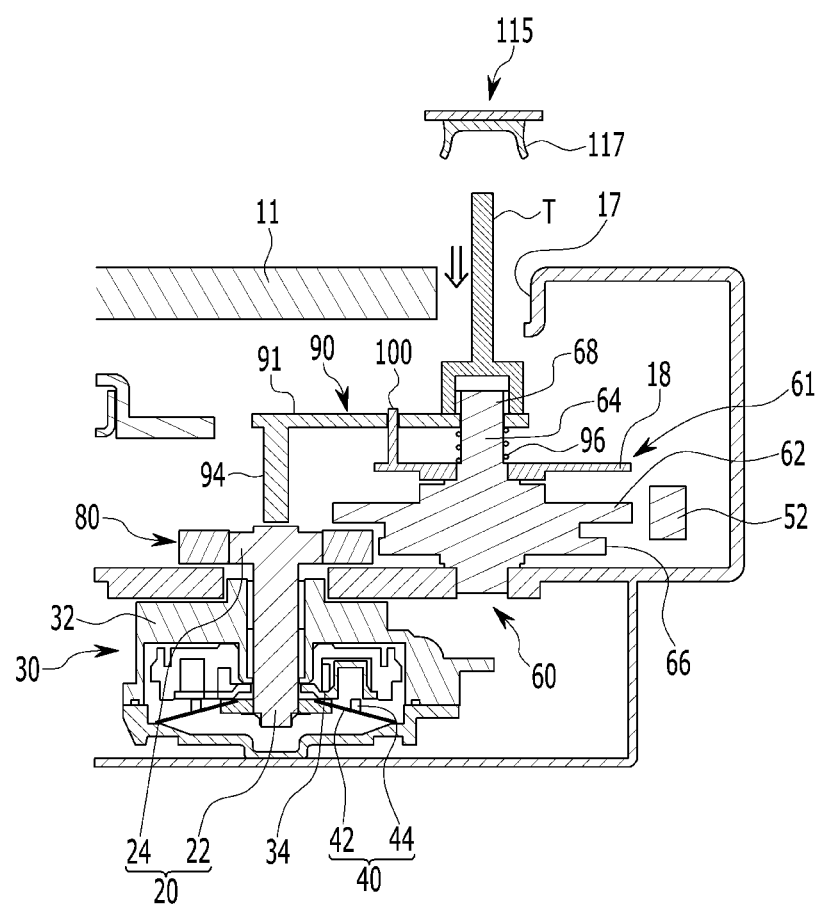
FIG. 9 and FIG. 10 are cross-sectional views of an auto sliding ramp for a vehicle according to another exemplary embodiment of the present invention.
Figure 10:
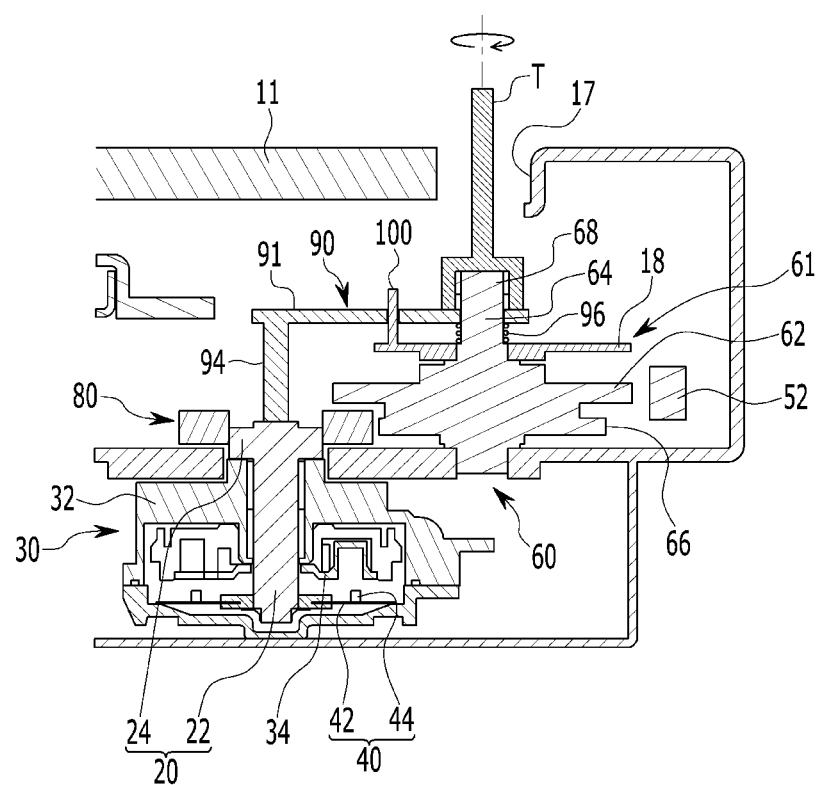

FIG. 9 and FIG. 10 are cross-sectional views of an auto sliding ramp for a vehicle according to another exemplary embodiment of the present invention.

In another exemplary embodiment of the auto sliding ramp for a vehicle shown in FIG. 7 to FIG. 10, compared to the auto sliding ramp for a vehicle according to the exemplary embodiment of the present invention shown in FIG. 1 to FIG. 6, only a partial configuration of the main drive 61 and the clutch operation part 90 are different, and other configurations are the same, so repeated descriptions will be omitted.

The auto sliding ramp 10 for a vehicle according to another exemplary embodiment of the present invention may include a clutch operation part 90 provided to release the connection between the drive motor 30 and the clutch rod 20 by pushing the clutch rod 20.

The clutch operation part 90 may include a manual lever 91 of which a lever hole 92 into which the drive shaft 64 is inserted is formed thereto and having a lever rod 94 provided at a position corresponding to the clutch rod 20.

The clutch operation part 90 may further include a return spring 96 mounted on the drive shaft 64 to elastically support the manual lever 91.

A guide hole 98 may be formed in the manual lever 91, and the clutch operation part 90 may further include a guide pin 100 inserted into the guide hole 98 to guide the movement of the manual lever 91.

The guide pin 100 may be mounted on the support plate 18, and the return spring 96 may be mounted between the support plate 18 and the manual lever 91 to elastically support the manual lever 91.

The auto sliding ramp 10 for a vehicle according to another exemplary embodiment of the present invention may further include a bolt cover 115 that is detachably coupled to the ramp housing 11 to cover the drive shaft 64.

That is, a drive shaft hole 17 is formed in the ramp housing 11 of the auto sliding ramp 10 for a vehicle according to another exemplary embodiment of the present invention, and a drive shaft hole cap 117 that may cover the drive shaft hole 17 in the bolt cover 115 may be formed. The drive shaft hole cap 117 is made of a material with elasticity, so it is possible to mount or detach the bolt cover 115 with a simple tool or manually.

Hereinafter, referring to FIG. 1 and FIG. 7 to FIG. 10, an operation of an auto sliding ramp for a vehicle according to another exemplary embodiment of the present invention will be described.

Since operation in the normal automatic mode is the same as the operation of the auto sliding ramp for a vehicle according to an exemplary embodiment of the present invention described above, repeated description is omitted.

If the deployment or storage of the step 12 by the operation of the drive motor 30 is not possible due to a failure or sticking of the drive motor 30, the user may operate the auto sliding ramp 10 for the vehicle in manual mode.

Referring to FIG. 1 and FIG. 9, the worker manually removes the bolt cover 115 mounted on the ramp housing 11.

Then, the user inserts a tool T, e.g., a wrench into the drive shaft hole 17 and presses it. Then, the manual lever 91 moves in the downward direction of the drawing according to the guidance of the guide pin 100, and the lever rod 94 pushes the clutch rod 20 to release the motor clutch 40. That is, the clutch elasticity part 42 is deformed by the movement of the clutch rod 20, and the clutch pad 44 is disengaged from the rotor 34. Accordingly, the main drive 61 and the drive motor 30 are separated.

Referring to FIG. 10, then, the user may rotate the drive shaft nut 68 using a tool T, for example a wrench, and the drive gear 62 rotates and drives the chain 52 so that the step 12 may be deployed from the ramp housing 11 or housed in the ramp housing 11.

When the user removes the force pressing the tool T, the manual lever 91 moves in the upward direction of the drawing by the force of the return spring 96, and the motor clutch 40 may be engaged.

Figure 11:
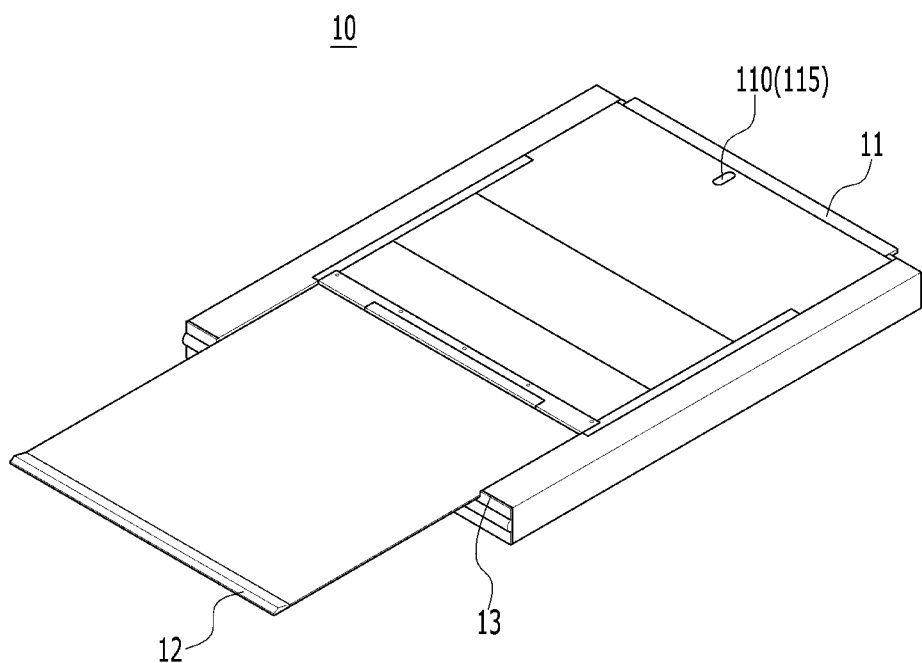
FIG. 11 is a perspective view showing the step development of an auto sliding ramp for a vehicle according to exemplary embodiments of the present invention.

FIG. 11 is a perspective view showing the step development of an auto sliding ramp for a vehicle according to exemplary embodiments of the present invention.

As shown in FIG. 11, the step 12 may be deployed by driving the operation motor or by manual operation of the user, or as shown in FIG. 1, the step 12 may be accommodated in the ramp housing 11.

According to the auto sliding ramp for a vehicle according to an exemplary embodiment of the present invention, a worker may convert the operation mode of the auto sliding ramp for a vehicle with a simple operation.

According to the auto sliding ramp for a vehicle according to an exemplary embodiment of the present invention, it is possible to promote the convenience of the user by not deploying or storing the step directly, and to reduce the risk of injury.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An auto sliding ramp for a vehicle, the auto sliding ramp comprising:
   a drive motor;
   a clutch rod comprising a clutch body slidably inserted inside the drive motor and a clutch gear mounted on the clutch body;
   a motor clutch connecting the drive motor and the clutch rod;
   a ramp drive unit configured to drive the ramp according to its rotation;
   a main drive comprising a drive gear engaged with the ramp drive unit and a drive shaft connected to the drive gear and configured to manually rotate the drive gear; and
   a clutch operation part configured to disengage the motor clutch by pushing the clutch rod.

2. The auto sliding ramp of claim 1, wherein the clutch operation part comprises:
   a guide part mounted on the ramp housing corresponding to a position of the clutch rod and having a guide thread formed therein; and
   a motor clutch bolt engaged with the guide thread and configured to disengage a connection between the drive motor and the clutch rod by pushing the clutch rod according to its rotation.

3. The auto sliding ramp of claim 2, wherein the main drive further comprises a drive shaft nut provided at a first end of the drive shaft and having the same dimensions as the motor clutch bolt.

4. The auto sliding ramp of claim 2, further comprising a bolt cover detachably coupled to the ramp housing to cover the motor clutch bolt and the drive shaft.

5. The auto sliding ramp of claim 1, further comprising a motor gear connecting the clutch gear and the main drive.

6. The auto sliding ramp of claim 5, wherein the clutch gear is movably provided in a length direction of the clutch body, and wherein the motor gear comprises:
   an inner gear engaged with the clutch gear; and
   an outer gear engaged with the main drive.

7. The auto sliding ramp of claim 6, wherein the main drive further comprises a connecting gear engaged with the outer gear.

8. The auto sliding ramp of claim 1, wherein the motor clutch comprises:
   a clutch elasticity part elastically supporting the clutch rod; and
   a clutch pad selectively in contact with a rotor of the drive motor according to a position of the clutch elasticity part.

9. An auto sliding ramp for a vehicle comprising:
   a drive motor;
   a clutch rod comprising a clutch body slidably inserted inside the drive motor and a clutch gear mounted on the clutch body;
   a motor clutch connecting the drive motor and the clutch rod;

a ramp drive unit configured to drive the ramp according to its rotation;

a main drive comprising a drive gear engaged with the ramp drive unit and a drive shaft connected to the drive gear and configured to manually rotate the drive gear; and a clutch operation part configured to disengage the motor clutch by pushing the clutch rod, wherein the clutch operation part comprises a manual lever comprising a lever hole into which the drive shaft is inserted and a lever rod provided at a position corresponding to the clutch rod.

10. The auto sliding ramp of claim 9, wherein the clutch operation part further comprises a return spring mounted on the drive shaft to elastically support the manual lever.

11. The auto sliding ramp of claim 9, wherein a guide hole is formed in the manual lever.

12. The auto sliding ramp of claim 11, wherein the clutch operation part further comprises a guide pin inserted into the guide hole to guide a movement of the manual lever.

13. The auto sliding ramp of claim 9, further comprising a bolt cover detachably coupled to the ramp housing to cover the drive shaft.

14. A method of providing an auto sliding ramp for a vehicle, the method comprising:
    providing a drive motor;
    providing a clutch rod comprising a clutch body slidably inserted inside the drive motor and a clutch gear mounted on the clutch body;
    providing a motor clutch connecting the drive motor and the clutch rod;
    providing a ramp drive unit that drives the ramp according to its rotation;
    providing a main drive comprising a drive gear engaged with the ramp drive unit and a drive shaft connected to the drive gear to manually rotate the drive gear; and
    providing a clutch operation part that disengages the motor clutch by pushing the clutch rod.

15. The method of claim 14, wherein the clutch operation part comprises:
    a guide part mounted on the ramp housing corresponding to a position of the clutch rod and having a guide thread formed therein; and
    a motor clutch bolt engaged with the guide thread that disengages a connection between the drive motor and the clutch rod by pushing the clutch rod according to its rotation.

16. The method of claim 15, wherein the main drive further comprises a drive shaft nut provided at a first end of the drive shaft and having the same dimensions as the motor clutch bolt.

17. The method of claim 15, further comprising detachably coupling a bolt cover to the ramp housing to cover the motor clutch bolt and the drive shaft.

18. The method of claim 14, further comprising providing a motor gear connecting the clutch gear and the main drive.

19. The method of claim 18, wherein the clutch gear is movably provided in a length direction of the clutch body, and wherein the motor gear comprises:
    an inner gear engaged with the clutch gear; and
    an outer gear engaged with the main drive.

20. The method of claim 19, wherein the main drive further comprises a connecting gear engaged with the outer gear.

* * * * *